Feb. 7, 1950 — J. THIBAULT — 2,497,050
AUTOMOBILE SUN VISOR
Filed March 22, 1949 — 3 Sheets-Sheet 1
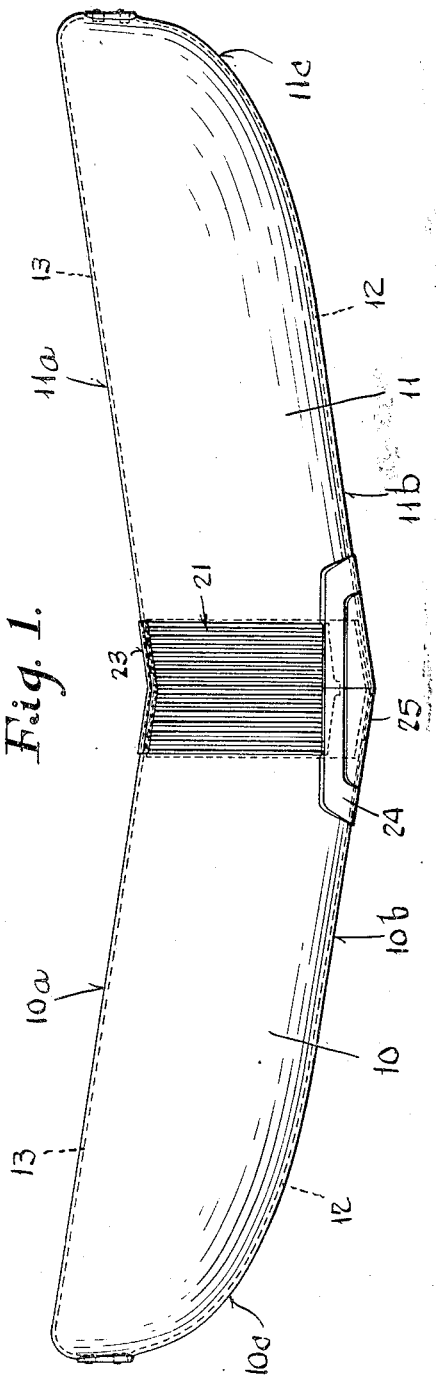
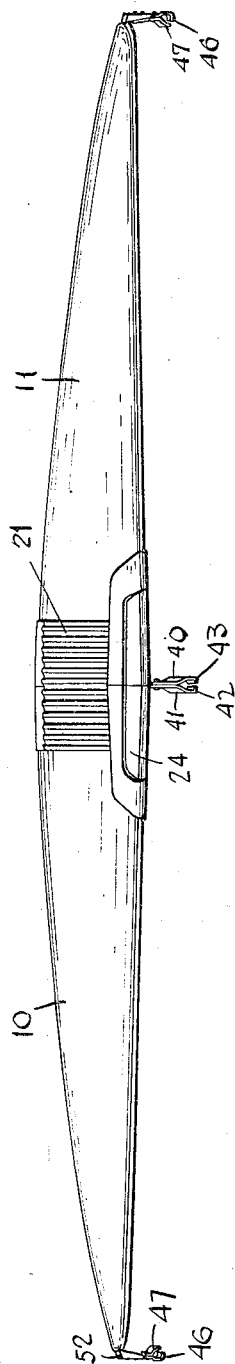
Inventor
Joseph Thibault
By Johnson and Kline
Attorneys

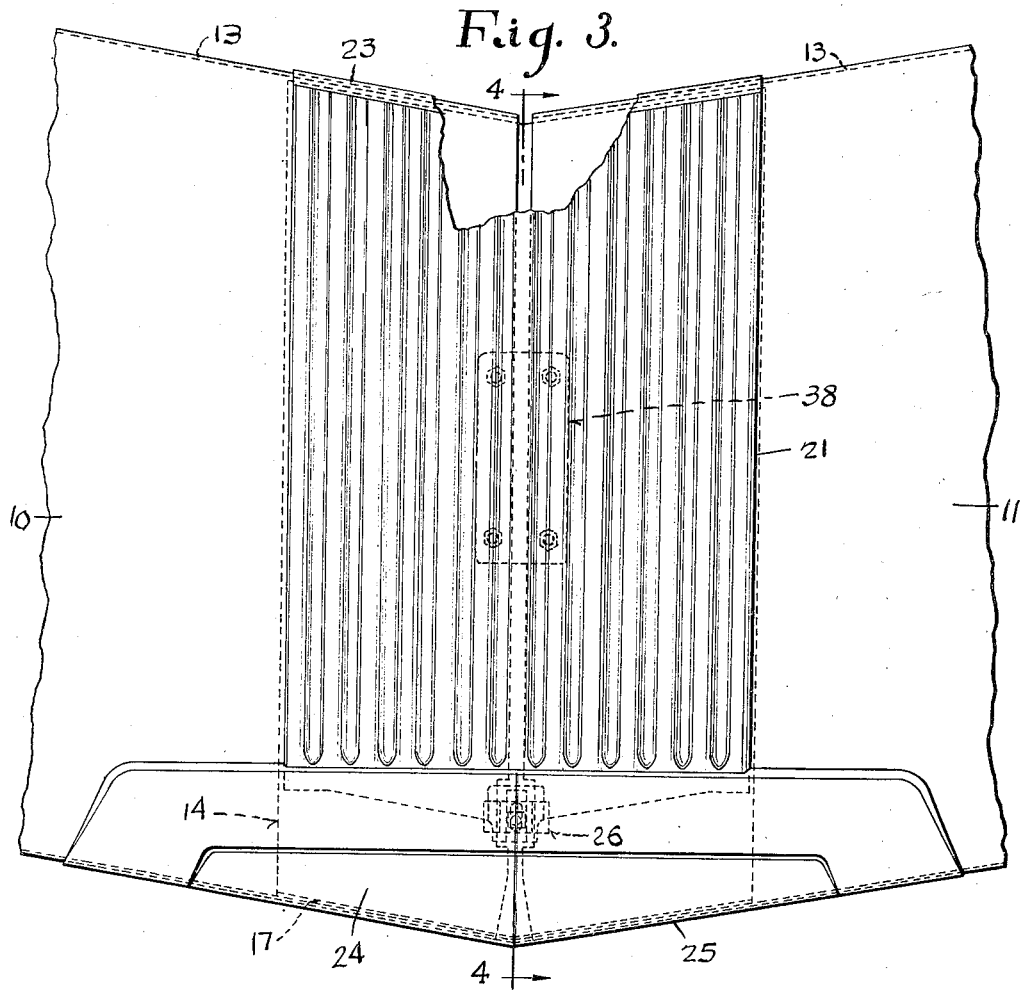
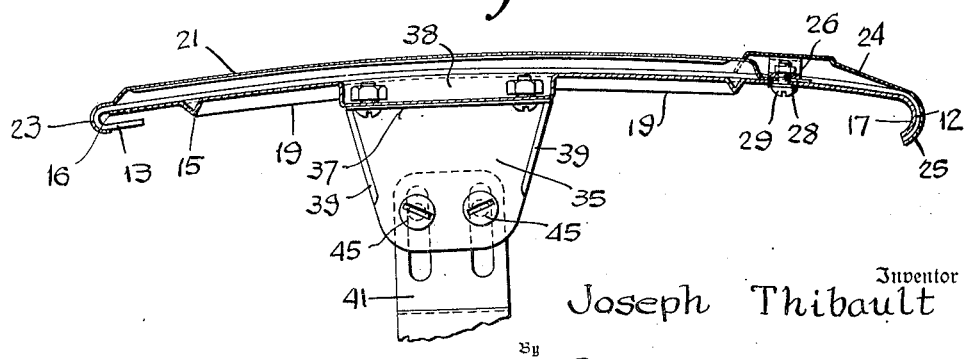

Feb. 7, 1950      J. THIBAULT      2,497,050
AUTOMOBILE SUN VISOR
Filed March 22, 1949      3 Sheets-Sheet 3
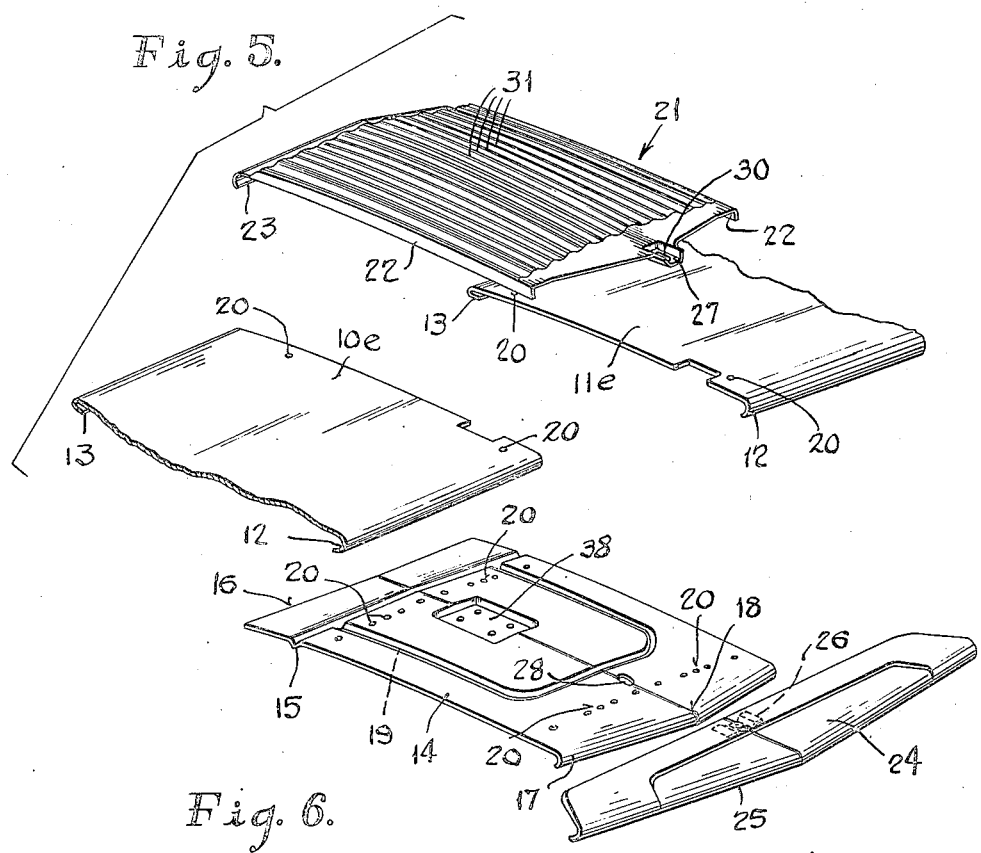
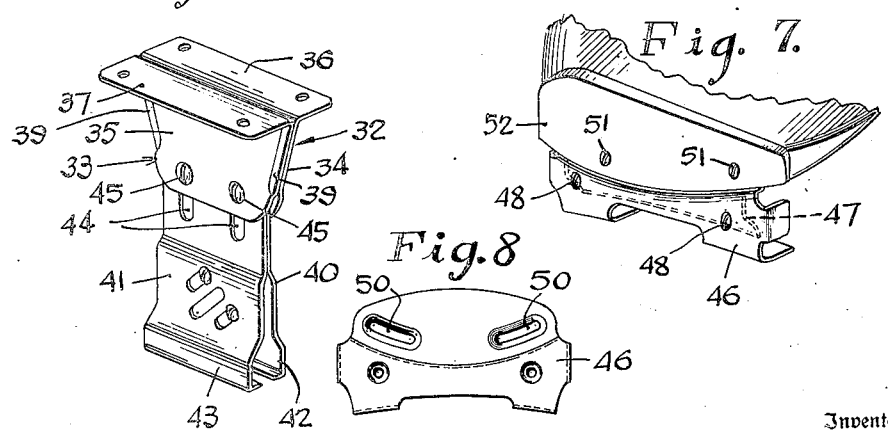
Inventor
Joseph Thibault
By Johnson and Kline
Attorneys Patented Feb. 7, 1950

2,497,050

UNITED STATES PATENT OFFICE 2,497,050

AUTOMOBILE SUN VISOR

Joseph Thibault, Bridgeport, Conn., assignor to Casco Products Corporation, Bridgeport, Conn., a corporation of Connecticut Application March 22, 1949, Serial No. 82,877

8 Claims. (Cl. 296—95)

This invention relates to externally mounted automobile visors, particularly visors which are supplied as accessories and are attachable to existing structures adjacent the automobile windshield.

An object of the invention is to provide an improved automobile visor attachment having left and right visor body sections which are adjustably connected at adjacent ends to adapt the visor to different car widths, wherein the adjustable connector means is so constructed and arranged as to permit of quick and easy adjustment, and to provide a strong and sturdy juncture between the sections to hold the visor rigid and enable it to withstand considerable stress when in use on a car traveling at high speeds.

Another object of the invention is to provide an improved attachable and adjustable car visor as above, wherein the adjustable connector means between the visor body sections is concealed and normally hidden from view.

A further object of the invention is to provide an improved attachable, adjustable car visor as characterized above, which is universally applicable and attachable to various makes of automobiles.

Still another object of the invention is to provide an improved adjustable car visor in accordance with the above, which has relatively few parts, said parts being of simple and economical construction and the entire visor being quickly and easily assembled and attached to the automobile, thereby reducing the fabrication and installation cost of the visor.

Other features and advantages will hereinafter appear.

In the accompanying drawings:

Figure 1 is a top or plan view of the improved automobile visor of the invention.

Fig. 2 is a front view of the visor shown in Fig. 1.

Fig. 3 is a fragmentary top or plan view of the center portion of the visor, showing details of the adjustable connecting means between the visor body sections.

Fig. 4 is a vertical section taken on line 4—4 of Fig. 3.

Fig. 5 is an exploded view in perspective of the adjustable connecting means for the visor body sections and adjacent end portions of said sections.

Fig. 6 is a perspective view of the connecting means between the center portion of the visor and the dividing strip of the automobile windshield.

Fig. 7 is a fragmentary perspective view of one end of the visor, and

Fig. 8 is a side elevational view of an end bracket for the visor.

Referring to Figs. 1 through 3, the improved car visor of the invention comprises right and left visor body sections 10 and 11 respectively, having elongate shapes with generally straight rear edges 10a and 11a, and straight front-edge portions 10b and 11b merging with curved edge-portions 10c and 11c adjacent the ends of the visor.

Referring to Figs. 1 and 4, the front and rear edges of the visor body sections 10 and 11 have downturned flanges or curls 12 and 13 respectively, which enhance the appearance of the visor, considerably strengthen the body sections, and function in conjunction with means now to be described, to rigidly secure together the visor body sections.

In accordance with the present invention improved connector means are provided between the visor body section 10 and 11, engageable with adjacent (inner) end portions of said sections for adjustably fastening together the sections to adapt the visor to different widths of cars, said connector means being easily and quickly adjustable, and strongly and rigidly joining the visor sections to each other to enable them to withstand considerable stresses, such as result from high air velocities when an automobile carrying the visor is traveling at high speeds.

In accomplishing this, referring to Figs. 4 and 5, a sheet-metal connector plate 14 is provided, arranged to extend under adjacent ends 10e and 11e of the visor body sections, and to closely conform to the under-surfaces of said ends. For reinforcement purposes, the cover plate 14 is provided with an embossed rib 15 projecting on its underside, extending laterally of the plate along and spaced from the rear plate edge 16. The front edge of the connector plate 14 is shaped to provide a depending flange or curl 17, portions of which extend angularly backward from the front center point 18 of the connector plate, to enable the flanges 17 to nest in the flanges 12 at the front edges of the visor body sections 10 and 11.

The connector plate 14 also has a U-shaped embossed rib 19 the ends of which meet with the rib 15 of the plate.

For the purpose of connecting the adjacent (inner) ends 10e and 11e of the visor body sections to the connector plate 14, series of bolt holes 20 are provided in the plate and visor body sections, whereby the latter may be secured to the plate in different relative positions by using bolts in different sets of holes.

Referring to Fig. 4, when the visor body sections are fastened to the connector plate 14 the flanges 12 and 17 of the body sections and plate will engage the nest one in the other as shown, and this engagement together with the fastening provided by the bolts, and together with the strength and rigidity of the connector plate due to its flanged and ribbed construction, provides an extremely sturdy assemblage.

For the purpose of concealing the connected ends 10e and 11e of the visor body section and the exposed portions of the connector plate 14, and to further strengthen and render rigid the said assemblage, an ornamental top cover plate 21 is provided, having a generally rectangular shape with downturned side flanges 22 and downwardly extending rear flange or curl 23, the latter being adapted to closely fit over and around the curls 13 at the rear edges of the visor body sections 10 and 11. A second top cover plate 24 is provided, having a down-turned flange or curl 25 adapted to closely fit over and around the curls 12 at the front edges 10b and 11b of the visor body sections. The cover plate 24 has a fastening bracket 26 secured to its underside, having a downwardly offset portion adapted to be received in a recessed portion 27 formed in the cover plate 21. The connector plate 14 is provided with a slot 28 to admit a screw 29, Figs. 4 and 5, whereby the connector plate may be bolted to the recessed portion 27 and to the fastening bracket 26 of the cover plates 21 and 24 respectively.

Preferably the recessed portion 27 of the cover plate 21 has a slot 30 whereby, prior to securing the cover plate tight the flange 23 at the rear thereof may be closely fitted to and around the flanges 13 at the rear edge of the visor body sections 10 and 11. The slot 30, together with the slot 28 in the connector plate 14, enable the front cover plate 24 to be shifted slightly so as to cause the flange 25 thereof to be closely fitted to and around the curls 12 of the front edges of the body sections.

For purposes of strength and ornamentation, the cover plate 21 may be provided with embossed ribs 31, extending from front to rear as shown.

In order to secure the center portion of the visor to the dividing strip of an automobile windshield, L-shaped brackets 32 and 33 are provided, Fig. 6, having corresponding depending legs 34 and 35 disposed in back-to-back relation whereby the brackets when together constitute a T. The brackets 32 and 33 have other legs 36 and 37 respectively, provided with bolt holes whereby they may be bolted to a recessed portion 38 of the connector plate 14.

Preferably the legs 34 and 35 of the brackets 32 and 33 are provided with flanges 39 along their sides, to space them apart slightly, the flanges 39 terminating short of the extremities of the legs. Interposed between the legs 34 and 35 are upwardly extending portions 40 and 41 of clamping jaws 42 and 43 adapted to embrace and grip opposite sides of a windshield dividing strip (not shown). The jaw portions 40 and 41 have slots 44 through which bolts 45 pass, the said bolts being carried by the bracket legs 34 and 35 and providing, in conjunction with the slots 44, an adjustable connection between the clamping jaws and L-shaped brackets.

For the purpose of securing the outer ends of the visor body sections 10 and 11 to the corner posts at the front of an automobile, pairs of cooperable brackets 46 and 47 are provided, Figs. 2, 7 and 8, said brackets being adapted to engage opposite sides of the drip moldings extending along the said corner posts.

The brackets 46 and 47 are secured together by bolts 48 whereby they may be made to clamp the drip moldings. The brackets 46 have upright body portions 49 provided with slots 50 which receive bolts 51 whereby the ends of the visor body sections 10 and 11 may be adjustably clamped to the brackets.

In order to conceal the slots 50, and to provide an attractive trim for the ends of the visor, cover plates 52 are provided, held in place under the heads of the bolts 51, the said cover plates being shaped to embrace and closely conform to the end contours of the visor body sections, as shown in Fig. 7.

It will be seen that, by the present invention, an extremely sturdy and rigid, adjustable connecting means is provided between the adjacent (inner) ends 10e and 11e of the visor body sections 10 and 11, whereby the said sections are securely and rigidly held in a strong assembly, yet are easily adjustable to different relative positions to adapt the visor to different car widths. The connector means for the visor body sections includes structure which effectively conceals the fastening means by which the sections are secured together, and provides an extremely attractive and ornamental trim for the visor.

With the above construction the adjustment of the visor sections may be easily and quickly effected, and the visor very quickly and conveniently installed on different makes and sizes of automobiles. By virtue of this fact, together with the few and simple parts constituting the visor and the economical fabrication and assembly of said parts, the cost to the consumer may be held to a low, advantageous figure.

The mounting means by which the other ends and center portion of the visor are secured to the car body above the windshield, while of simple construction, are extremely sturdy so that the visor will withstand heavy stresses such as are caused by high velocity air currents during the travel of the automobile at high speeds.

Variations and modifications may be made within the scope of this invention and portions of the improvements may be used without others.

I claim:

1. In an automobile sun visor, left and right visor body sections disposed end-to-end; a connector plate under the adjacent ends of the body sections; means for securing the plate and visor sections together in different relative positions whereby the sections are held closer to or further away from each other to adapt the visor to different car widths; a cover plate overlying adjacent end portions of the visor sections at the rear of the visor; cooperable means at the rear edges of the visor sections and cover plate, adapted to hold the said edges against lateral separation without restricting adjustment of the visor sections toward or away from each other; a second cover plate, overlying adjacent end portions of the visor sections at the front of the visor; cooperable means at the front edges of the visor sections and second cover plate adapted to hold the said edges against lateral separation without restricting said adjustment of the visor sections; and means for securing to the connector plate central portions of the cover plates which are located remote from the said held edges.

2. In an automobile sun visor, left and right visor body sections disposed end-to-end; a connector plate under the adjacent ends of the body sections; means for securing the plate and visor sections together in different relative positions whereby the sections are held closer to or further away from each other to adapt the visor to different car widths; a cover plate overlying adjacent end portions of the visor sections; cooperable means at the rear edges of the visor sections and cover plate, adapted to hold the said edges against lateral separation without restricting adjustment of the visor sections toward or away from each other; a second cover plate, overlying adjacent end portions of the visor sections at the front of the visor; cooperable means at the front edges of the visor sections and second cover plate, adapted to hold the said edges against lateral separation without restricting said adjustment of the visor sections; means for securing to the connector plate central portions of the cover plates, located remote from the said held edges; and means secured to said connector plate, for supporting the plate on the dividing strip of a car windshield.

3. In an automobile sun visor, left and right visor body sections disposed end-to-end; a connector plate under the adjacent ends of the body sections; means for securing the plate and visor sections together in different relative positions whereby the sections are held closer to or further away from each other to adapt the visor to different car widths; a cover plate overlying adjacent end portions of the visor sections; cooperable means at the rear edges of the visor sections and cover plate, adapted to hold the said edges against lateral separation without restricting adjustment of the visor sections toward or away from each other; a second cover plate, overlying adjacent end portions of the visor sections at the front of the visor, the rear portion of said second cover plate overlying the front portion of said first cover plate; cooperable means at the front edges of the visor sections and second cover plate, adapted to hold the said edges against lateral separation without restricting said adjustment of the visor sections; and means including a fastener attached to the underside of said rear portion of the second cover plate and hidden from view from above of said plate, for securing to the connector plate central portions of the cover plates which are located remote from the said held edges.

4. In an automobile sun visor, left and right visor body sections disposed end-to-end; a connector plate under the adjacent ends of the body sections; means for securing the plate and visor sections together in different relative positions whereby the sections are held closer to or further away from each other to adapt the visor to different car widths; a cover plate overlying the adjacent end portions of the visor sections; cooperable nesting flanges at the rear edges of the visor sections and cover plate, adapted to hold the said edges against lateral separation without restricting adjustment of the visor sections toward or away from each other; a second cover plate, overlying adjacent end portions of the visor sections at the front of the visor; cooperable nesting flanges at the front edges of the visor sections and second cover plate, adapted to hold the said edges against lateral separation without restricting said adjustment of the visor sections; and means for securing to the connector plate central portions of the cover plates which are located remote from the said held edges, said means providing for limited front-to-rear adjustment of the cover plates on the connector plate to enable the said interlocking flanges of the visor sections and cover plates to be closely fitted against each other.

5. In an automobile sun visor, left and right visor body sections disposed end-to-end; a connector plate under the adjacent ends of the body sections; means including bolts and including a series of holes for each bolt in the connector plate and visor sections, for securing the plate and sections together in different relative positions whereby the sections are held closer to or further away from each other to adapt the visor to different car widths; a cover plate overlying the adjacent end portions of the visor sections; cooperable nesting flanges at the rear edges of the visor sections and cover plate, adapted to hold the said edges against lateral separation without restricting adjustment of the visor sections toward or away from each other; a second cover plate, overlying adjacent end portions of the visor sections at the front of the visor; cooperable nesting flanges at the front edges of the visor sections and second cover plate, adapted to hold the said edges against lateral separation without restricting said adjustment of the visor sections; and means for securing to the connector plate central portions of the cover plates which are located remote from the said held edges.

6. In an automobile sun visor, left and right visor body sections disposed end-to-end; a connector plate under the adjacent ends of the body sections; means for securing the plate and visor sections together in different relative positions whereby the sections are held closer to or further away from each other to adapt the visor to different car widths; a cover plate overlying adjacent end portions of the visor sections at the rear of the visor; cooperable nesting flanges at the rear edges of the visor sections and cover plate, adapted to hold the said edges against lateral separation without restricting adjustment of the visor sections toward or away from each other; a second cover plate, overlying adjacent end portions of the visor sections at the front of the visor; cooperable nesting flanges at the front edges of the visor sections, connector plate and second cover plate, adapted to hold the said edges against lateral separation without restricting said adjustment of the visor sections; and means for securing to the connector plate central portions of the cover plates which are located remote from the said held edges.

7. In an automobile sun visor, left and right visor body sections disposed end-to-end; a connector plate under the adjacent ends of the body sections; means for securing the plate and visor sections together in different relative positions whereby the sections are held closer to or further away from each other to adapt the visor to different car widths; a cover plate overlying adjacent end portions of the visor sections at the rear of the visor; cooperable means at the rear edges of the visor sections and cover plate, adapted to hold the said edges against lateral separation without restricting adjustment of the visor sections toward or away from each other; a second cover plate, overlying adjacent end portions of the visor sections at the front of the visor; cooperable means at the front edges of the visor sections, connector plate and second cover plate, adapted to hold the said edges against lateral separation without restricting said adjustment of the visor sections; and means for securing to the connector plate central portions of the cover plates which are located remote from the said held edges.

8. In an automobile sun visor, left and right visor body sections disposed end-to-end; a connector plate under the adjacent ends of the body sections; means for securing the plate and visor sections together in different relative positions whereby the sections are held closer to or further away from each other to adapt the visor to different car widths; a cover plate overlying adjacent end portions of the visor sections at the rear of the visor; cooperable means at the rear edges of the visor sections and cover plate, adapted to hold the said edges against lateral separation without restricting adjustment of the visor sections toward or away from each other; a second cover plate, overlying adjacent end portions of the visor sections at the front of the visor; cooperable means at the front edges of the visor sections and second cover plate, adapted to hold the said edges against lateral separation without restricting said adjustment of the visor sections; and means for securing to the connector plate central portions of the cover plates which are located remote from the said held edges, said means comprising a pair of L-shaped brackets disposed with corresponding legs back-to-back whereby the brackets form a T, the other legs of said brackets being fastened to the connector plate, and said means further comprising clamping jaws for engaging said windshield dividing strip, having portions interposed between the back-to-back legs of said L-shaped brackets.

JOSEPH THIBAULT.

REFERENCES CITED

The following references are of record in the file of this patent:

UNITED STATES PATENTS

| Number | Name | Date |
|---|---|---|
| 471,217 | Greenwald et al. | Mar. 22, 1892 |
| 2,334,856 | Atkinson | Nov. 23, 1943 |